United States Patent [19]

Tang

[11] Patent Number: 5,404,002
[45] Date of Patent: Apr. 4, 1995

[54] BACKUP METHOD FOR MULTIPLE SOURCE OPTICAL SCANNER

[75] Inventor: Hong Tang, Duluth, Ga.

[73] Assignee: AT&T Global Information Solutions Company, Dayton, Ohio

[21] Appl. No.: 61,942

[22] Filed: May 17, 1993

[51] Int. Cl.6 ............................................. G06K 7/10
[52] U.S. Cl. .................... 235/462; 235/467; 359/204; 362/20; 362/212; 362/259
[58] Field of Search .............. 235/467, 462; 362/20, 362/212, 259; 359/204

[56] References Cited

U.S. PATENT DOCUMENTS

| | | | |
|---|---|---|---|
| 4,460,240 | 7/1984 | Hudson | 350/6.8 |
| 4,461,974 | 7/1984 | Chiu | 362/20 |
| 4,474,422 | 10/1984 | Kitamura | 350/6.8 |
| 4,561,717 | 12/1985 | Kataoka et al. | 350/6.8 |
| 4,574,197 | 3/1986 | Kliever | 250/334 |
| 4,591,242 | 5/1986 | Broockman et al. | 350/3.71 |
| 4,637,679 | 1/1987 | Funato | 350/6.5 |
| 4,796,961 | 1/1989 | Yamada et al. | 350/6.8 |
| 4,805,974 | 2/1989 | Brueggemann et al. | 350/6.7 |
| 4,939,355 | 7/1990 | Rando et al. | 235/467 |
| 4,962,983 | 10/1990 | Watanabe | 350/6.8 |
| 5,023,515 | 6/1991 | Olon et al. | 362/20 |
| 5,028,770 | 7/1991 | Miyazaki et al. | 235/467 |
| 5,073,702 | 12/1991 | Schuhmacher | 235/467 |
| 5,157,533 | 10/1992 | Hanamoto | 359/204 |

*Primary Examiner*—Eugene R. LaRoche
*Assistant Examiner*—Christopher R. Glembocki
*Attorney, Agent, or Firm*—Paul W. Martin

[57] ABSTRACT

A backup method for a multiple source optical scanner which alerts an operator when one of the sources has failed. A controller monitors the operation of each source and flags the failed sources. In the case of a scanner having dual full-time channels, the controller removes power from the failed source and disregards the signal from the failed source. In the case of a scanner having non-simultaneously operating sources, the controller switches the remaining source of the scanner to full-time operation. If both sources have failed, power to the failed sources is turned off.

5 Claims, 3 Drawing Sheets

BACKUP METHOD FOR MULTIPLE SOURCE OPTICAL SCANNER

CROSS REFERENCE TO RELATED APPLICATION

The present invention is related to commonly assigned and U.S. application entitled, "Multiple Source Optical Scanner", filed Sep. 14, 1992, invented by Tang, and having a Ser. No. 07/944,576.

BACKGROUND OF THE INVENTION

The present invention relates to multiple source optical scanners and more specifically to a backup method for a multiple source optical scanner.

In the related Application cited above, a multiple source optical scanner is disclosed. A first embodiment of the optical scanner includes a plurality of scanning light sources of different wavelengths, collimating and focusing optics for producing a beam for each source, reflecting optics for aligning each beam in a predetermined direction, a collector for collecting light reflected from a bar code label to be scanned, filter optics for separating the different wavelengths of light, and processing circuitry having a plurality of processing channels for converting the reflected light of each wavelength into electrical signals based upon the intensities of the reflected light. The first embodiment may also include a mirrored spinner and a plurality of pattern mirrors.

A second embodiment of the optical scanner includes a plurality of scanning light sources of the same wavelength, collimating and focusing optics for producing a beam for each source, reflecting optics for aligning each beam in a predetermined direction, a collector for collecting light reflected from a bar code label to be scanned, and processing circuitry having a single processing channel for converting the reflected light into electrical signals based upon the intensities of the reflected light. The scanner additionally includes modulation and control circuitry, which turns the sources off and on in sequence. The second embodiment may also include a mirrored spinner and a plurality of pattern mirrors.

While the multiple source optical scanner works well, it is difficult for an operator to determine when one of the sources has failed. In such a state, the performance of the multiple source optical scanner is reduced.

Therefore, it would be desirable to provide a backup method for a multiple source optical scanner which detects a malfunctioning source and alerts an operator. In the case of a scanner having multiple full-time channels, it would be desirable to remove power from the failed source, and to disregard the signal from the channel of the failed source. In the case of a scanner having non-simultaneously operating sources, it would be desirable to place the operating sources in a full-time mode of operation.

SUMMARY OF THE INVENTION

In accordance with the teachings of the present invention, a backup method for a multiple source optical scanner is provided. The method includes the steps of monitoring the operation of each source, alerting an operator when one of the sources has failed, and flagging the failed source. If the scanner employs multiple channels, then the method further includes the steps of removing power from the failed sources and disregarding the signal from the channels of the failed sources. If the scanner employs sources which alternate in operation, then the method further includes the step of switching the remaining operating sources to full-time operation. If both sources have failed, power is removed from the scanner.

It is accordingly an object of the present invention to provide a backup method for a multiple source optical scanner.

It is another object of the present invention to provide a backup method for a multiple source optical scanner having multiple channels, which includes the step of disregarding the signals from the channels of the failed sources.

It is another object of the present invention to provide a backup method for a multiple source optical scanner which alerts an operator of the malfunctioning sources and which switches the operating sources to a full-time mode of operation, if they are not already operating full-time.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
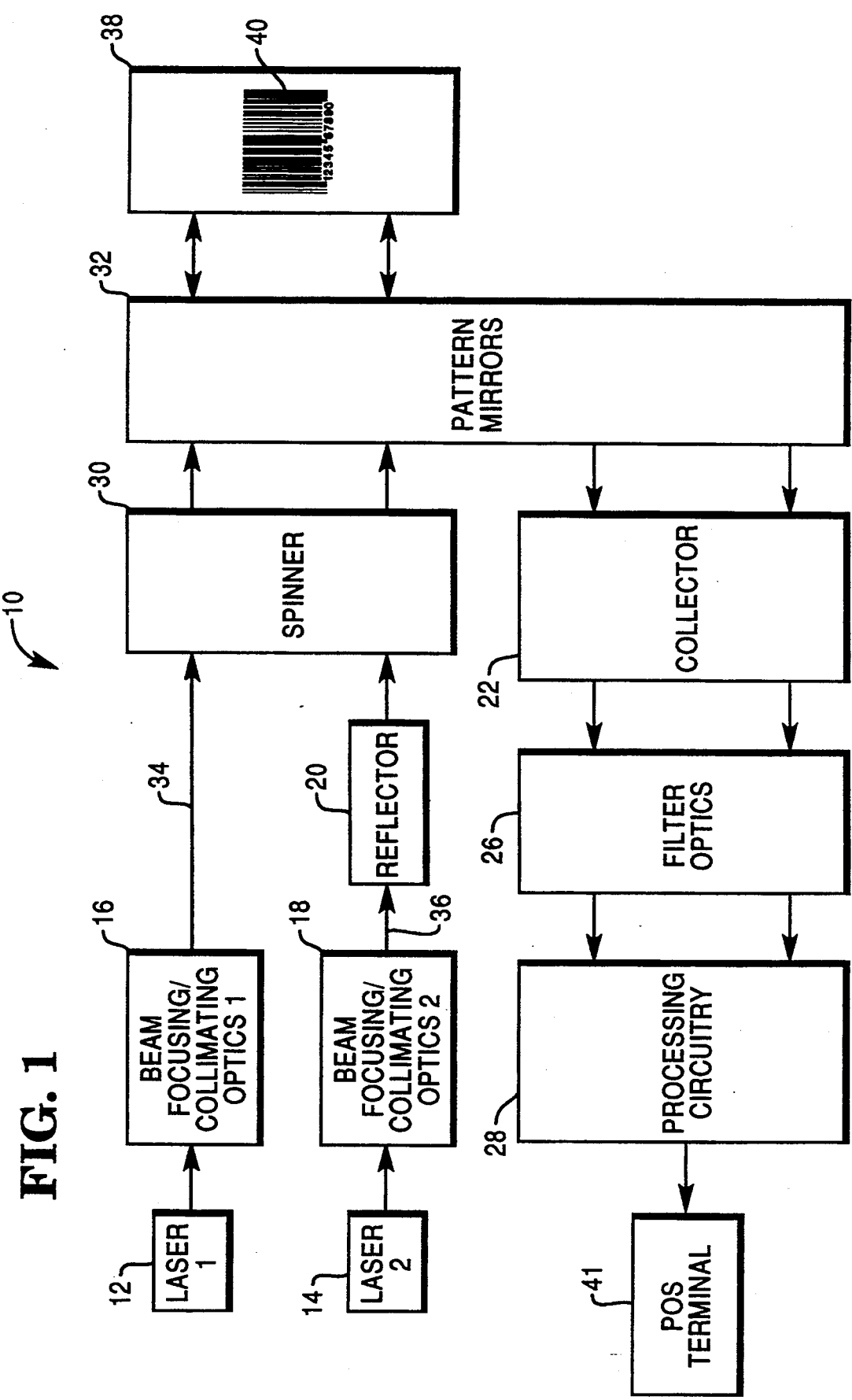
FIG. 1 is a block diagram of a first multiple source optical scanner.

Referring now to FIG. 1, a first multiple source optical scanner 10 includes first laser source 12, second laser source 14, first collimating and focusing optics 16, second collimating and focusing optics 18, reflector 20, collector 22, filter optics 26, and processing circuitry 28. Optical scanner 10 may also include spinner 30 and pattern mirrors 32.

Laser sources 12 and 14 are preferably laser diodes. Although two are shown, any number of laser sources are envisioned. Some commercially available laser diodes envisioned for use in the present invention produce light at 635 nanometers (nm), 670 nm, and 780 nm.

First and second beam collimating and focusing optics 16 and 18 produce laser beams 34 and 36 and each may include a focusing lens and an aperture, as known in the art.

Reflector 20 orients beam 36 in a desired direction with respect to beam 34. Preferably, reflector 20 substantially aligns beam 36 with beam 34 to produce two beams propagating in the same direction. Reflector 20 may include a flat mirror.

Collector 22 collects light reflected from an item 38 having a bar code label 40 to be scanned. Collector 22 may include a collecting mirror with a central aperture for passing the outgoing beams 34 and 36.

Filter optics 26 is located between collector 22 and processing circuitry 28 and directs the reflected light of different wavelengths into separate channels corresponding to the wavelengths of laser sources 12 and 14.

Processing circuitry 28 converts the reflected light into electrical signals based upon the intensity of the reflected light and may send the electrical signals to a host terminal, such as a point-of-service (POS) terminal 41.

Where included, spinner 30 and pattern mirrors 32 reflect beams 34 and 36 in a plurality of directions to form a scan pattern.

Figure 2:
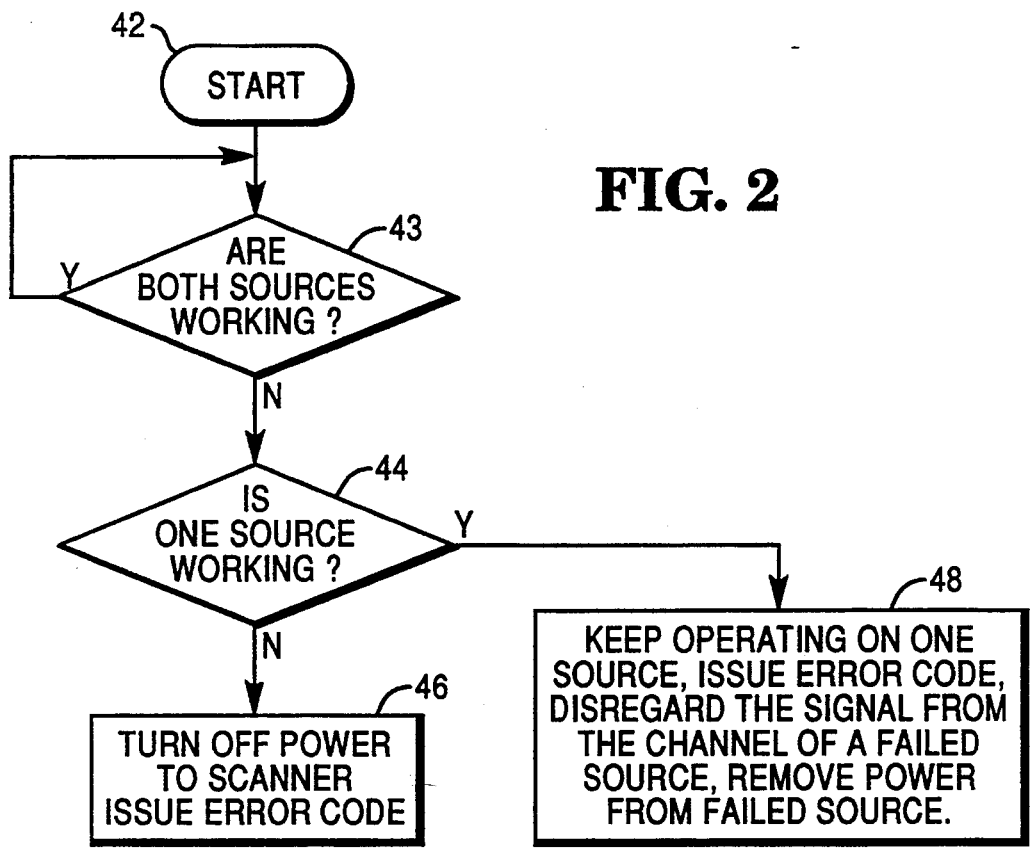
FIG. 2 is a flow diagram of a first backup method for use with the scanner of FIG. 1.

Turning now to FIG. 2, a backup method for use with the scanner of FIG. 1 is shown, beginning with START 42.

In block 43, processing circuitry 28 continually monitors laser sources 12 and 14 to determine if they are operating.

If both of laser sources 12 and 14 are not operating, then processing circuitry 28 determines whether one of laser sources 12 and 14 is working in block 44.

In block 46, if neither of sources 12 and 14 are operating, then processing circuitry 28 issues an error code and alerts the operator that both sources are malfunctioning. Processing circuitry 28 then instructs the operator to remove power from the scanner.

In block 48, if one of sources 12 and 14 is operating, then processing circuitry 28 issues an error code identifying the malfunctioning source and alerts an operator that performance will be degraded. Processing circuitry 28 disregards the signal from the failed channel and removes power from the failed source.

Figure 3:
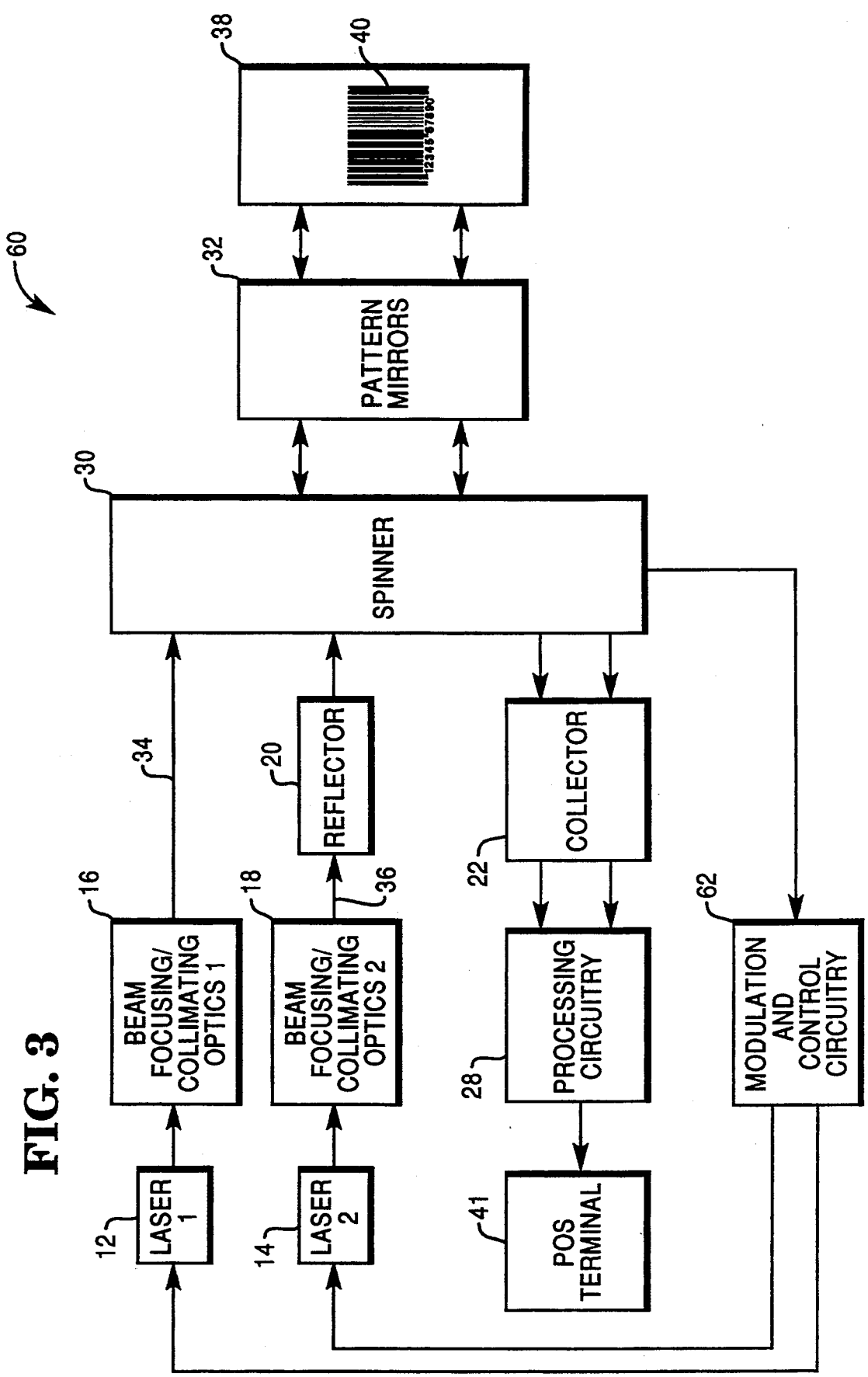
FIG. 3 is a block diagram of a second embodiment of a multiple source optical scanner.

Referring now to FIG. 3, a second embodiment 60 of the optical scanner of the present invention is shown. Like scanner 10, scanner 60 includes first laser source 12, second laser source 14, first collimating and focusing optics 16, second collimating and focusing optics 18, reflector 20, collector 22, and processing circuitry 28. Preferably, laser sources 12 and 14 emit light at the same wavelength. Optical scanner 60 may also include spinner 30 and pattern mirrors 32.

Scanner 60 additionally includes modulation and control circuitry 62, which turns laser sources 12 and 14 off and on in alternating fashion.

Figure 4:
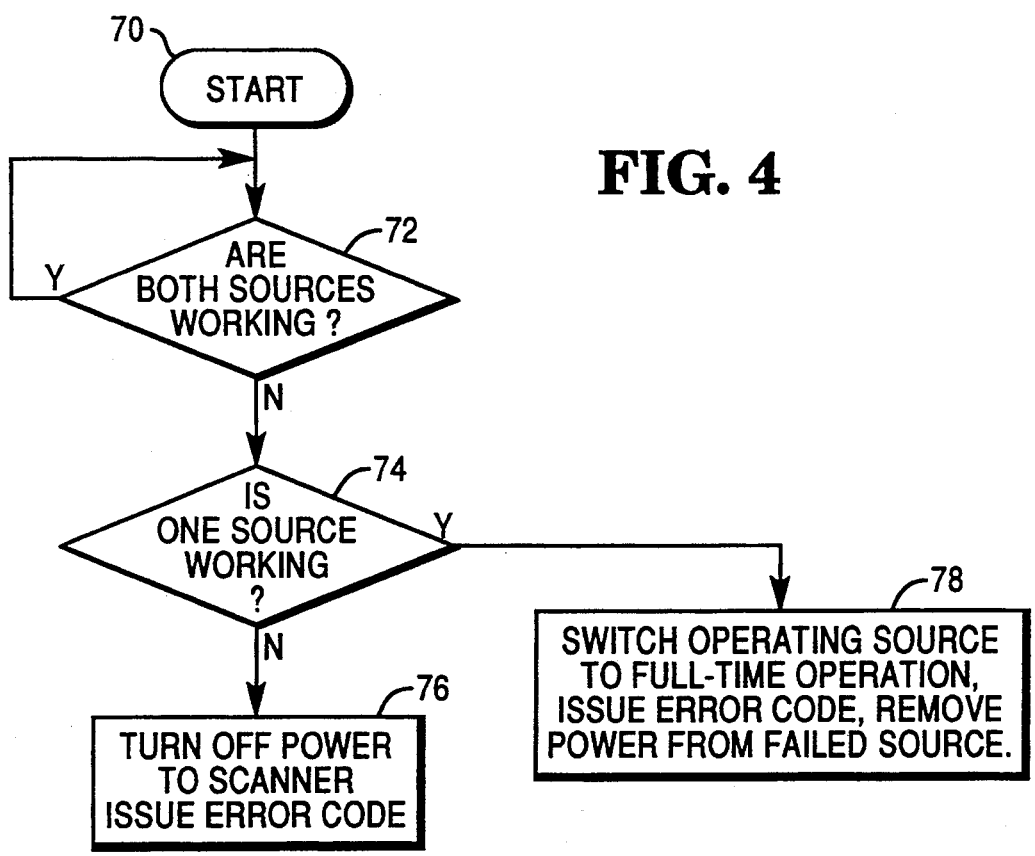
FIG. 4 is a flow diagram of a second backup method for use with the scanner of FIG. 3.

Referring now to FIG. 4, a backup method for use with the scanner of FIG. 3 is shown, beginning with START 70.

In block 72, processing circuitry 28 continually monitors laser sources 12 and 14 to determine if they are operating.

If both of laser sources 12 and 14 are not operating, then processing circuitry 28 determines whether one of laser sources 12 and 14 is working in block 74.

In block 76, if neither of sources 12 and 14 are operating, then processing circuitry 28 issues an error code and alerts the operator that both sources are malfunctioning. Processing circuitry 28 then instructs the operator to shut the scanner off.

In block 78, if one of sources 12 and 14 is operating, then processing circuitry 28 issues an error code identifying the malfunctioning source and alerts an operator that performance will be degraded. Processing circuitry 28 removes power from the failed source and switches the operating source into a full-time mode of operation.

Although the present invention has been described with particular reference to certain preferred embodiments thereof, variations and modifications of the present invention can be effected within the spirit and scope of the following claims.

What is claimed is:

1. A backup method for a multiple laser source optical bar code scanner comprising the steps of:
    monitoring the operation of each laser source;
    alerting an operator when one of the laser sources has failed;
    flagging the failed laser source; and,
    switching the remaining operating laser sources to full-time operation.

2. The method as recited in claim 1, further comprising the step of:
    removing power from the failed laser source.

3. The method as recited in claim 1, further comprising the steps of:
    turning off power to the optical bar code scanner if all of the laser sources have failed.

4. A backup method for a dual source optical bar code scanner in which the two laser sources alternate operation comprising the steps of:
    monitoring the operation of each laser source;
    alerting an operator when one of the laser sources has failed;
    flagging the failed laser source;
    removing power from the failed laser source; and
    switching the remaining operating laser source to full-time operation.

5. A backup method for a dual source optical bar code scanner in which the two laser sources operate simultaneously and in which each laser source has a separate channel for producing a signal containing bar code information, the method comprising the steps of:
    monitoring the operation of each laser source;
    alerting an operator when one of the laser sources has failed;
    flagging the failed laser source;
    removing power from the failed laser source; and
    disregarding the signal from the channel of the failed laser source.

* * * * *